United States Patent
Jiang

(10) Patent No.: US 11,182,035 B2
(45) Date of Patent: Nov. 23, 2021

(54) CAPACITIVE HOVER TOUCH SENSOR, DEVICE, AND ELECTRONIC EQUIPMENT

(71) Applicant: SHENZHEN GOODIX TECHNOLOGY CO., LTD., Guangdong (CN)

(72) Inventor: Hong Jiang, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 8 days.

(21) Appl. No.: 16/455,691

(22) Filed: Jun. 27, 2019

(65) Prior Publication Data
US 2020/0073512 A1 Mar. 5, 2020

(30) Foreign Application Priority Data

Aug. 29, 2018 (CN) .......................... 201821406294.8

(51) Int. Cl.
*G06F 3/044* (2006.01)
(52) U.S. Cl.
CPC .......... *G06F 3/0446* (2019.05); *G06F 3/0443* (2019.05); *G06F 3/0445* (2019.05); *G06F 2203/04104* (2013.01); *G06F 2203/04107* (2013.01); *G06F 2203/04108* (2013.01); *G06F 2203/04111* (2013.01)

(58) Field of Classification Search
CPC .... G06F 3/0446; G06F 3/0445; G06F 3/0443; G06F 2203/04104; G06F 2203/04107; G06F 2203/04108; G06F 2203/04111
See application file for complete search history.

(56) References Cited

U.S. PATENT DOCUMENTS

| | | | |
|---|---|---|---|
| 2011/0141040 A1* | 6/2011 | Kang | G06F 3/044 345/173 |
| 2013/0176262 A1* | 7/2013 | Hsu | G06F 3/0446 345/174 |
| 2015/0077370 A1* | 3/2015 | Kim | G06F 3/04166 345/173 |

(Continued)

FOREIGN PATENT DOCUMENTS

| | | |
|---|---|---|
| CN | 108153445 A | 6/2018 |
| KR | 101658139 B1 | 9/2016 |

OTHER PUBLICATIONS

Extended European Search Report dated Dec. 13, 2019, Patent Application No. 19182159.4-1221, 8 pages.

*Primary Examiner* — Yuzhen Shen
(74) *Attorney, Agent, or Firm* — USCH Law, PC

(57) ABSTRACT

Disclosed is a capacitive hover touch sensor, a touch device adopting the capacitive hover touch sensor and an electronic equipment adopting the touch device. The capacitive hover touch sensor comprises an electrode pattern layer where a touch region is formed; the touch region is divided into P sub-regions, P being a natural number greater than 1; each of the sub-regions is provided with a plurality of first strip electrodes in a one-dimensional array and a plurality of second strip electrodes in a one-dimensional array; the plurality of first strip electrodes are interdigitated with the plurality of second strip electrodes; and the plurality of first strip electrodes and the plurality of second strip electrodes in each of the sub-regions are respectively connected to a touch controller by wires.

13 Claims, 8 Drawing Sheets

(56) References Cited

U.S. PATENT DOCUMENTS

| | | | |
|---|---|---|---|
| 2015/0242022 A1* | 8/2015 | Hung | G06F 3/04164 345/174 |
| 2016/0011687 A1* | 1/2016 | Ding | G06F 3/0446 345/174 |
| 2016/0034081 A1* | 2/2016 | Ichiki | G06F 3/0445 345/173 |
| 2017/0192560 A1* | 7/2017 | Ham | G06F 3/041 |
| 2017/0262093 A1* | 9/2017 | Noguchi | G06F 3/0412 |
| 2018/0039358 A1* | 2/2018 | Xie | G06F 3/044 |
| 2018/0074357 A1* | 3/2018 | Chen | G06F 3/0443 |
| 2018/0173346 A1* | 6/2018 | Du | H01L 27/1214 |
| 2018/0348902 A1* | 12/2018 | Zhang | G06F 3/0443 |
| 2019/0095007 A1* | 3/2019 | Jeong | G06F 1/1643 |
| 2020/0379605 A1* | 12/2020 | Zhang | G06F 3/0446 |

* cited by examiner

CAPACITIVE HOVER TOUCH SENSOR, DEVICE, AND ELECTRONIC EQUIPMENT

CROSS-REFERENCE TO RELATED APPLICATION

This application claims the priority benefit of Chinese Patent Application No. 201821406294.8 filed on Aug. 29, 2018 and entitled "CAPACITIVE HOVER TOUCH SENSOR, DEVICE, AND ELECTRONIC EQUIPMENT", the disclosure of which is incorporated by reference herein in its entirety.

TECHNICAL FIELD

The present disclosure relates to touch control technologies, especially a capacitive hover touch sensor, a touch device adopting the capacitive hover touch sensor and an electronic equipment adopting the touch device.

BACKGROUND

With the development of touch technologies, a multi hover touch technology has emerged, which may bring about better experience of human-machine interaction.

SUMMARY

Some embodiments are directed to provide a capacitive hover touch sensor, a touch device adopting the capacitive hover touch sensor and an electronic equipment adopting the touch device, which may guarantee higher touch recognition accuracy while decreasing the number of capacitive detection channels and difficulty in design and manufacturing and cost of production.

An embodiment of the present disclosure provides a capacitive hover touch sensor, including an electrode pattern layer where a touch region is formed; the touch region is divided into P sub-regions, P being a natural number greater than 1; each of the sub-regions is respectively provided with a plurality of first strip electrodes in a one-dimensional array; and a plurality of second strip electrodes in a one-dimensional array; the plurality of first strip electrodes are interdigitated with the plurality of second strip electrodes; and the plurality of first strip electrodes and the plurality of second strip electrodes in each of the sub-regions are respectively connected to a touch controller by wires.

An embodiment of the present disclosure further provides a capacitive hover touch device comprising a touch controller and the capacitive hover touch sensor as described above; and the capacitive hover touch sensor is connected with the touch controller.

An embodiment of the present disclosure further provides an electronic equipment, comprising the capacitive hover touch device as described above.

Compared with the existing technology, the embodiment divides the touch region of the capacitive hover touch sensor into a plurality of sub-regions. In each of the sub-regions, the plurality of first strip electrodes are in a one-dimensional array, the plurality of second strip electrodes are in a one-dimensional array, and the plurality of first strip electrodes are interdigitated with, but not electrically contact with the plurality of second strip electrodes. In this way, in a case where substantially the same touch detection accuracy is involved, the number of capacitive detection channels required in the existing technology is equivalent to a sum of intersection points between all the first strip electrodes and all the second strip electrodes; while in this embodiment, the number of capacitive detection channels required is merely a sum of the number of the first strip electrodes and the number of the second strip electrodes. Therefore, the number of electrode wires, the number of capacitive detection channels and the number of pins of the touch controller may be reduced, so that difficulty in manufacturing and cost of production may be reduced.

In one example, the electrode pattern layer is of a single-layer structure, and the capacitive hover touch sensor further comprises a bridge layer disposed in a stack with the electrode pattern layer; both the first strip electrodes and the second strip electrodes are located in the electrode pattern layer of the single-layer structure; each of the first strip electrodes and each of the second strip electrodes respectively comprise a plurality of electrode patterns, with the plurality of electrode patterns of the first strip electrodes being connected in series, and the plurality of electrode patterns of the second strip electrodes being connected in series; and the electrode patterns of the plurality of first strip electrodes are interdigitated with the electrode patterns of the plurality of second strip electrodes, and the electrode patterns of either the first strip electrodes or the second strip electrodes at intersection points are bridged by the bridge layer.

In one example, the plurality of electrode patterns of each of the first strip electrodes are triangular electrode patterns located at both ends of the first strip electrode and a plurality of rhombic electrode patterns located between the triangular electrode patterns, and two triangular electrode patterns of any first strip electrode respectively have one vertex toward the center of the first strip electrode; and the plurality of electrode patterns of each of the second strip electrodes are triangular electrode patterns located at both ends of the second strip electrode and a plurality of rhombic electrode patterns located between the triangular electrode patterns, and two triangular electrode patterns of any second strip electrode respectively have one vertex toward the center of the second strip electrode.

In one example, the electrode pattern layer is of a double-layer structure; and the plurality of first strip electrodes are located in one layer of the double-layer structure, and the plurality of second strip electrodes are located in the other layer of the double-layer structure.

In one example, all of the first strip electrodes and all of the second strip electrodes are of rectangular electrode patterns, and an area of any electrode pattern in an upper layer of the double-layer structure is smaller than an area of any electrode pattern in a lower layer.

In one example, the capacitive hover touch further comprises a trace layer disposed in a stack with the electrode pattern layer; first vias are formed in the electrode patterns of the first strip electrodes and/or the second strip electrodes, and second vias are formed in the electrode pattern layer, with the first vias and the second vias being electrically connected by wires in the trace layer, and the second vias being connected to the touch controller by wires on the electrode pattern layer.

In one example, the capacitive hover touch sensor further comprises a shield layer for providing shielding protection for the electrode pattern layer.

In one example, each of the sub-regions comprises four first strip electrodes and four second strip electrodes.

BRIEF DESCRIPTION OF THE DRAWINGS

One or more embodiments are described as examples with reference to the corresponding figures in the accompanying drawings, and the examples do not constitute a limitation to the embodiments. Elements with the same reference numerals in the accompanying drawings represent similar elements. The figures in the accompanying drawings do not constitute a proportion limitation unless otherwise stated.

DETAILED DESCRIPTION

The embodiments of the present disclosure will be described in detail below with reference to the accompanying drawings in order to make the objectives, technical solutions and advantages of the present invention clearer. However, it will be apparent to those skilled in the art that, in the various embodiments of the present invention, numerous technical details are set forth in order to provide the reader with a better understanding of the present disclosure. However, the technical solutions claimed in the present disclosure can be implemented without these technical details and various changes and modifications based on the following embodiments.

It shall be noted that the words "upper", "lower", "left", "right" and the like described in the embodiments of the present disclosure are described based on the drawings, and shall not be perceived as a limitation to the embodiments of the present disclosure. In addition, in the context, it shall also be perceived that when an element is referred to as "on" or "under" another element, it may be formed "on" or "under" the other element directly or indirectly through an intermediate element.

Figure 1:
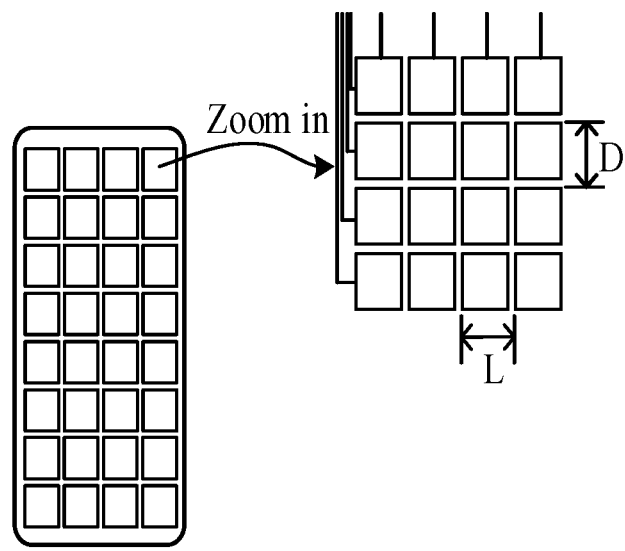
FIG. 1 is a structural schematic diagram of a sensing electrode of a capacitive hover touch sensor in the existing technology.

In a current multi hover touch solution in this industry, a two-dimensional lattice array arrangement as shown in FIG. 1 is generally adopted for sensing electrodes, and an individual sensing electrode is a rectangular graphic with a width of L and a height of D as shown in FIG. 1.

The inventors find that at least the following problems exist in the existing technology: in the multi hover touch device shown in FIG. 1, each rectangular sensing electrode (corresponding to one touch detection point) is connected to a touch controller by a wire, that is, each touch detection point corresponds to an individually configured capacitive detection channel. Therefore, in a case where higher touch recognition accuracy is required, the number of capacitive detection channels increases greatly, resulting in a large increase in manufacturing difficulty and cost.

In view of the above, the present disclosure relates to a capacitive hover touch sensor, which may be applied to, but not limited to, an electronic equipment such as a smart phone, a tablet computer, a laptop, or the like. The capacitive hover touch sensor includes an electrode pattern layer where a touch region is formed. The touch region is divided into P sub-regions, the number of which may be determined by area of the touch region and touch detection performance. The larger the touch region is, the larger the number of the sub-regions is; the smaller the touch region is, the smaller the number of the sub-regions is. Each of the sub-regions is respectively provided with a plurality of first strip electrodes and a plurality of second strip electrodes. The plurality of first strip electrodes and the plurality of second strip electrodes are respectively connected to a touch controller by wires. Herein, the plurality of first strip electrodes are in a one-dimensional array, the plurality of second strip electrodes are in a one-dimensional array, and the plurality of first strip electrodes are interdigitated with the plurality of second strip electrodes. For example, the plurality of first strip electrodes in each sub-region are in a row array, and the plurality of second strip electrodes are in a column array, interdigitating to form a plurality of intersection points. The touch controller may use the intersection points between the first strip electrodes and the second strip electrodes in each sub-region to perform touch position recognition. Each intersection point has a same touch position recognition function with an individual sensing electrode of individually arranged two-dimensional lattice sensing electrodes in the existing technology. That is, capacitive detection channels of the same number as the sum of the number of the first strip electrodes and the number of the second strip electrodes are adopted to realize a touch position detection accuracy equivalent to the touch position detection accuracy realized by capacitive detection channels of the same number as the sum of the intersection points of the same number of the first strip electrodes and the second strip electrodes. Since the sum of the number of the first strip electrodes and the number of the second strip electrodes in each sub-region is smaller than the sum of the intersection points, the number of wires between the sensing electrodes (i.e., the first strip electrodes and the second strip electrodes) and the touch controller, the number of capacitive detection channels and the number of pins of the touch controller may be reduced, so that difficulty in design and manufacturing and cost of production may be reduced.

Figure 2:
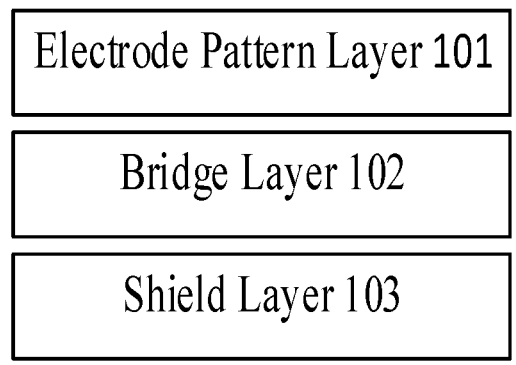
FIG. 2 is a schematic side diagram of a capacitive hover touch sensor.
Figure 3:
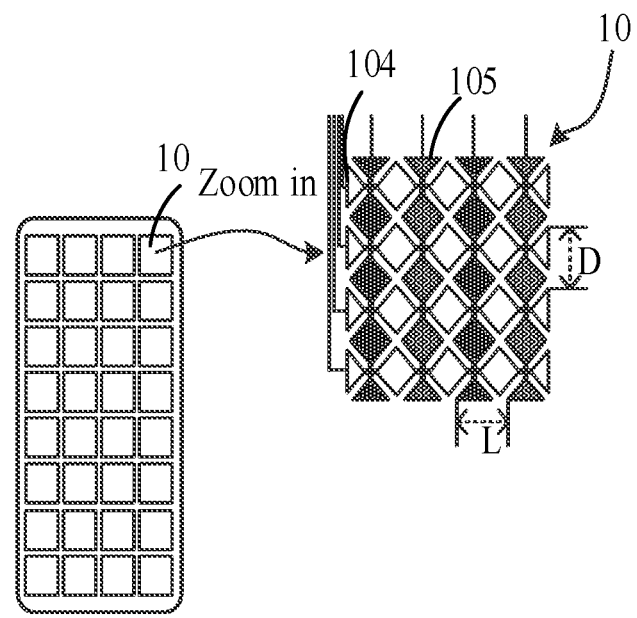
FIG. 3 is a structural schematic diagram of the capacitive hover touch sensor and sub-regions of the capacitive hover touch sensor.
Figure 4:
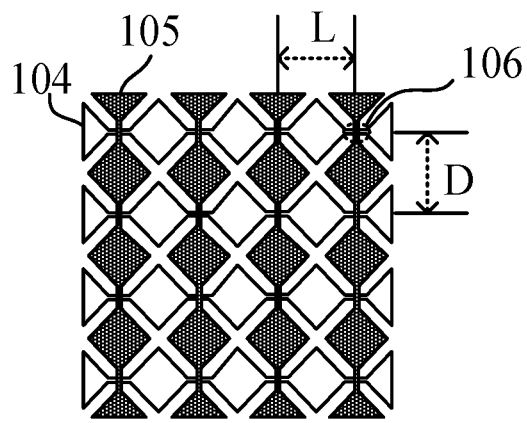
FIG. 4 is a structural schematic diagram of a bridge connection of the capacitive hover touch sensor.
Figure 5:
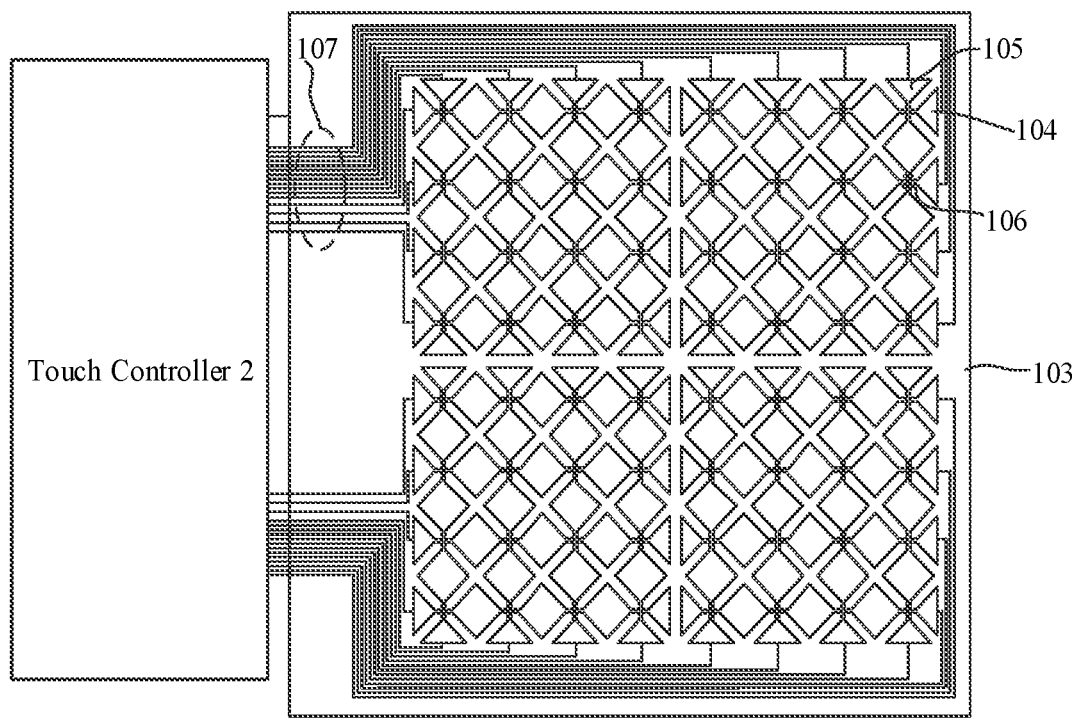
FIG. 5 is a schematic diagram of a connection between a strip electrode of the capacitive hover touch sensor including a shield layer and a touch controller.

Specifically, an electrode pattern layer 101 is of a single-layer structure. With reference to FIG. 2, the capacitive hover touch sensor further includes a bridge layer 102 disposed in a stack with the electrode pattern layer 101, and a shield layer 103; the shield layer 103, the bridge layer 102 and the electrode pattern layer 101 are disposed in a stack one by one bottom up. With reference to FIG. 3 to FIG. 5, both the first strip electrodes and the second strip electrodes are located in the electrode pattern layer 101 of the single-layer structure. Each of the first strip electrodes 104 and each of the second strip electrodes 105 respectively comprise a plurality of electrode patterns. A plurality of electrode patterns of the first strip electrodes 104 are connected in series. A plurality of electrode patterns of the second strip electrodes 105 are connected in series. The electrode patterns of the plurality of first strip electrodes 104 interdigitate with the electrode patterns of the plurality of second strip electrodes 105. The electrode patterns of either the first strip electrodes 104 or the second strip electrodes 105 at intersection points are bridged by the bridge layer 102. For example, the first strip electrodes 104 form row electrodes of a sub-region 10 and the second strip electrodes 101 form column electrodes of the sub-region 10, to which the present disclosure is not limited, but the first strip electrodes and the second strip electrodes may not be perpendicular otherwise.

The plurality of electrode patterns of each of the first strip electrodes 104, for example, are respectively triangular electrode patterns located at both ends of the first strip electrode 104 and a plurality of rhombic electrode patterns located between the triangular electrode patterns, and two triangular electrode patterns of any first strip electrode 104 respectively have one vertex toward the center of the first strip electrode 104. Similarly, the plurality of electrode patterns of each of the second strip electrodes 105 are respectively triangular electrode patterns located at both ends of the second strip electrode 105 and a plurality of rhombic electrode patterns located between the triangular electrode patterns, and two triangular electrode patterns of any second strip electrode respectively have one vertex toward the center of the second strip electrode 105. In other words, both ends of any first strip electrode 104 and both ends of any second strip electrode 105 is one side of a triangular electrode pattern thereof. The side may be perpendicular to the first strip electrode 104 and the second strip electrode 105, so that electrode patterns of the first strip electrode 104 and second strip electrode 105 form a rectangular or square sub-region 10, facilitating fabrication of the electrode pattern. Both the first strip electrode 104 and the second strip electrode 105 are of rhombic electrode patterns, facilitating cross-over arrangement of the first strip electrode 104 and second strip electrode 105 that take generally the same areas. In practical applications, a first strip electrode and a second strip electrode may otherwise be of a polygonal electrode pattern such as of a hexagon or an octagon, to which the present disclosure is not specifically limited.

The bridge layer 102 is stacked under the electrode pattern layer 101. With further reference to FIG. 4, at intersection points of electrode patterns of the first strip electrodes 104 and the second strip electrodes 105, a plurality of electrode patterns of the second strip electrodes 105 are directly interconnected in the electrode pattern layer 101, and a plurality of electrode patterns of the first strip electrodes 104 are bridged by the bridge layer 102, to which the present disclosure is not limited. In some other examples, the plurality of electrode patterns of the first strip electrodes may be directly interconnected in the electrode pattern layer, and the plurality of electrode patterns of the second strip electrodes may be bridged by the bridge layer. Electrode patterns that are bridged are disconnected at intersection points, the bridge layer has vias at the disconnections of the electrode patterns, and a conductive structure is formed between the via and the bridge layer, so that an electrical connection between electrode patterns at intersection points is realized. It shall be understood that any manner that may realize bridging falls into the protection scope of this application.

It shall be noted that, each strip electrode, that is, all of the first strip electrodes 104 and all of the second strip electrodes 105 are connected to a touch controller 2 by wires 107 on the electrode pattern layer 101. Herein, a plurality of adjacent sub-regions, for example, four adjacent sub-regions, may be combined into a larger sub-region, and wires of the strip electrodes in the larger sub-region may be disposed around the larger sub-region, facilitating fabrication of electrode patterns and wires.

Figure 6:
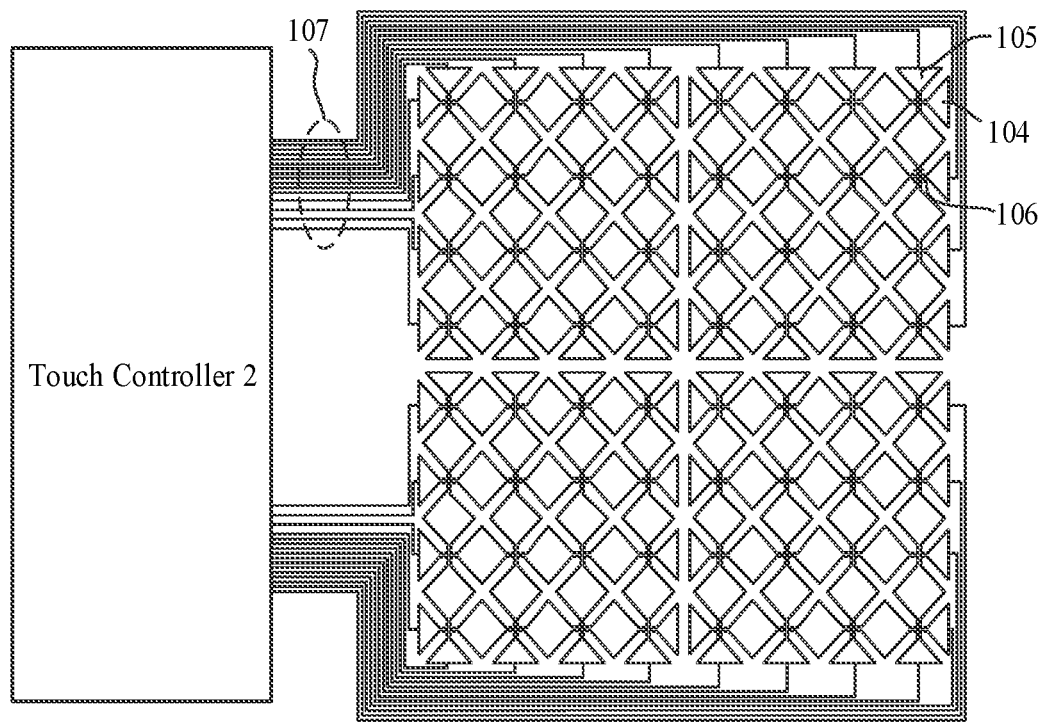
FIG. 6 is a schematic diagram of a connection between the strip electrode of the capacitive hover touch sensor not including the shield layer and the touch controller.

It is worth mentioning that, the shield layer 103 for providing shielding protection for the electrode pattern layer 101 is disposed under the bridge layer 102, and the shield layer 103 may be a grounding metal layer, so as to shield electromagnetic interference, to which the present disclosure is not limited. In some examples, with reference to FIG. 6, the shield layer may be omitted according to application requirements and practical conditions.

The multi touch is realized by a cross-over arrangement of strip electrodes. Each strip electrode (the first strip electrode 104 or the second strip electrode 105) may only support one finger's hover touch. The cross-over arrangement of the plurality of strip electrodes may result in a plurality of intersection points, each of which may realize hover touch. It is described in the following the manner in which the multi hover touch is implemented by the strip electrodes as follows.

Herein, the number of the first strip electrodes is denoted as M, the number of the second strip electrodes is denoted as N, which interdigitate to obtain M*N intersection points (i.e. number of touch points). That M=4 and N=4, i.e., each sub-region includes four first strip electrodes 104 and four second strip electrodes 105, is taken as an example, and that 512 detection channels are required as an example. The entire touch region is divided into 32 sub-regions each including M+N (i.e., 8) strip electrodes, and then each sub-region may support 4*4 (i.e., 16) touch points. Therefore, in a case where 512 touch points are supported, only 32*8 (i.e., 256) detection channels are required as 50% less than current 512 channels, that is, 256 detection channels are reduced. Correspondingly, wires between the strip electrodes and the touch controller 2 are reduced by half, and the number of pins of the touch controller 2 is reduced by half, which may significantly reduce difficulty in fabrication of the wires and pins of the touch controller. In some examples, the number of the first strip electrodes and second strip electrodes in each sub-region may be varied, for example, the number may be set as, but not limited to, eight. The more the number of the cross-over arranged strip electrodes in each sub-region, the smaller the number of detection channels required for the capacitive hover touch sensor. For the sake of simple design, a width L and a height D of the first strip electrodes and second strip electrodes may be equal.

Compared with the existing technology, by disposing interdigitating strip electrodes in the electrode pattern layer, this solution may use the interdigitating strip electrodes to realize multi hover, which solves the problems of difficulty in design and fabrication and high cost due to too large numbers of detection channels, wires and pins of the touch controller resulted from multi hover by directly using individual capacitive detection channels.

Further, instead that all the strip electrodes are connected to the touch controller by wires in the electrode pattern layer, all the strip electrodes may be connected to the touch controller by wires in the trace layer, so that the wires for the strip electrodes may be prevented from occupying the areas of the electrode patterns, which facilitates improving touch sensitivity.

Figure 7:
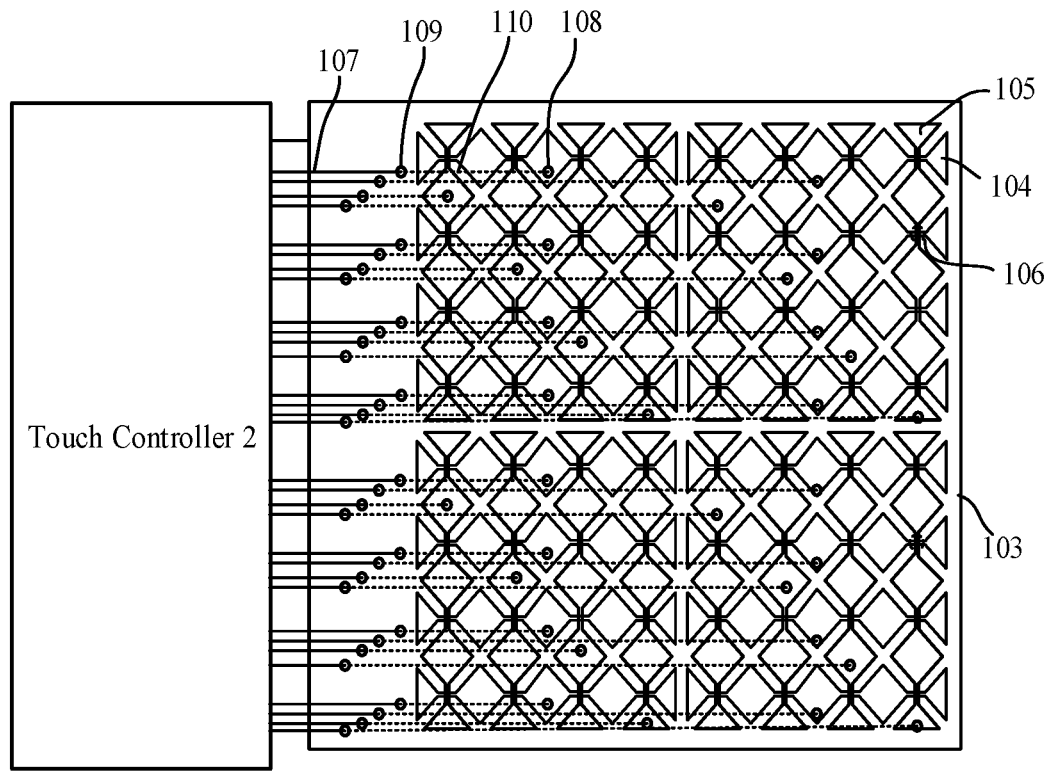
FIG. 7 is another structural schematic diagram of strip electrodes of the capacitive hover touch sensor being connected to the touch controller by a trace layer.
Figure 8:
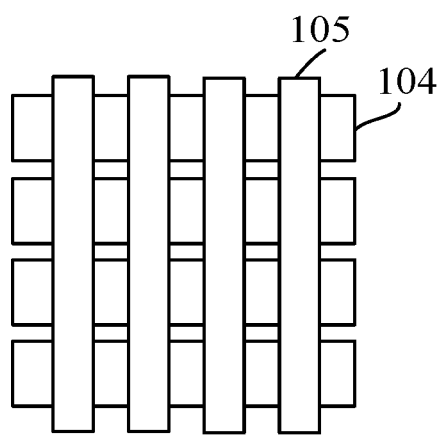
FIG. 8 is still another schematic diagram of a strip electrode arrangement in a sub-region of the capacitive hover touch sensor.
Figure 9:
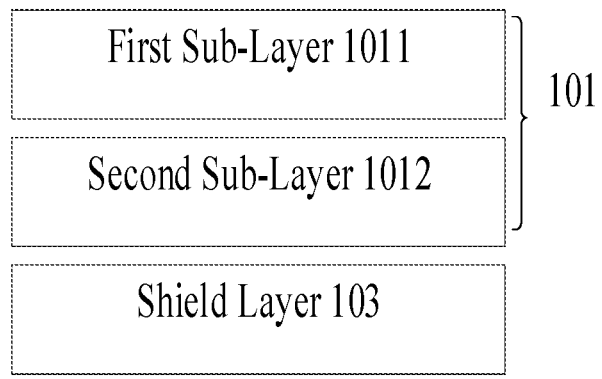
FIG. 9 is still another schematic side diagram of the capacitive hover touch sensor.
Figure 10:
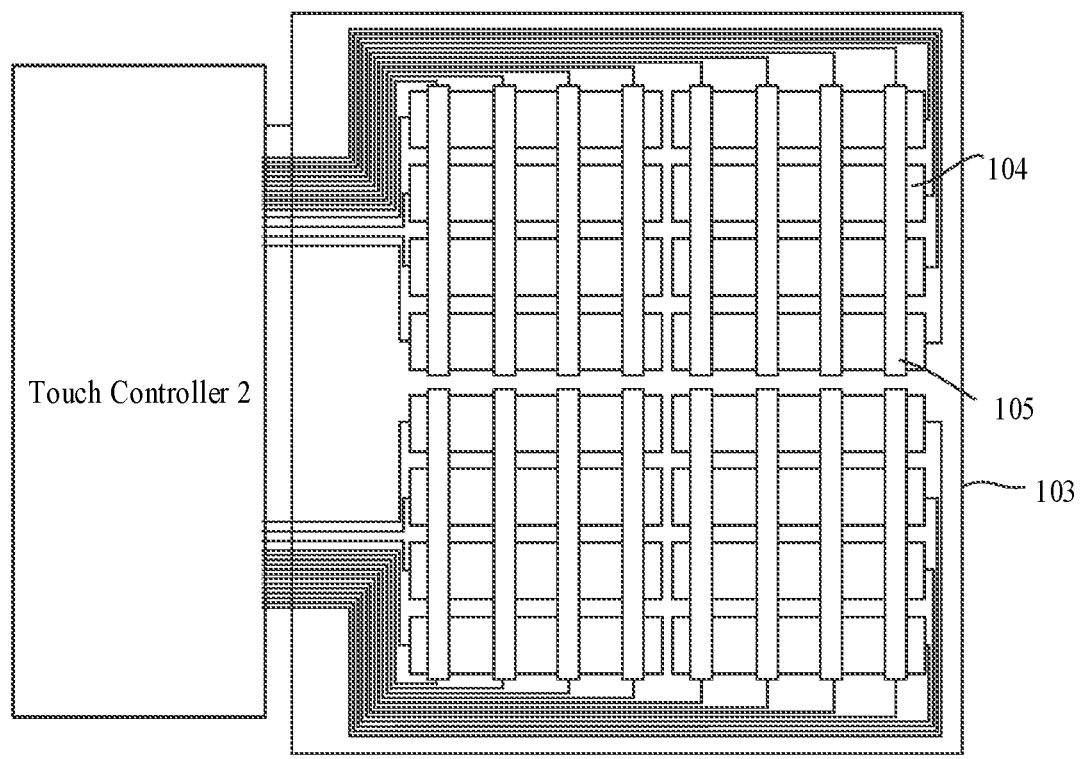
FIG. 10 is still another structural schematic diagram of a connection between strip electrodes of the capacitive hover touch sensor including a shield layer and a touch controller.

With reference to FIG. 2 and FIG. 7, the capacitive hover touch sensor further includes a trace layer disposed in a stack with the electrode pattern layer 101. In this case, the bridge layer 102 may be reused as the trace layer, to which the present disclosure is not limited. An individual trace layer 111 (see FIG. 12) may be used and disposed in a stack under the bridge layer. First vias 108 are formed in the electrode patterns of the first strip electrodes 104 and the second strip electrodes 105, and second vias 109 are formed in the electrode pattern layer 101. The first vias 108 and the second vias 109 are electrically connected by wires 110 in the trace layer, and the second vias 109 are connected to the touch controller 102 by wires 107 on the electrode pattern layer 101, so that the first strip electrodes 104 and the second strip electrodes 105 are electrically connected to the touch controller 2. Specifically, the plurality of second vias 109 may be in an array, and the plurality of first vias 108 may also be in an array. Herein, the first vias 108 of the first strip electrodes 104 in each sub-region may be arranged in a row on the rhombic electrode pattern, and the first vias 108 of the second strip electrodes 105 may be arranged in a generally equidistant manner in a direction of extension of the second strip electrodes 105, thereby facilitating fabrication of the first vias 108 and the second vias 109. In order to avoid short circuits, the wires in the trace layer need to bypass a bridge region. By moving wires that connect the first strip electrodes 104 to the touch controller 2 and the second strip electrodes 105 to the touch controller 2 to the trace layer, the wires of the strip electrodes may be prevented from occupying too much area of the electrode pattern layer 101, which further facilitates increasing area taken by the electrode patterns and improving sensitivity of hover touch. The trace layer is interconnected through the second vias to the electrode pattern layer 101 to realize interconnection between the strip electrodes and the touch controller 2, to which the present disclosure is not limited, for example, electrodes in the electrode pattern layer 101 may be interconnected with the touch controller through other layers of the capacitive hover touch sensor. In some examples, some of the first strip electrodes and second strip electrodes may be interconnected with the touch controller 2 through the trace layer, or either the first strip electrodes or the second strip electrodes may be interconnected with the touch controller 2 through the trace layer.

It shall be noted that the capacitive hover touch sensor includes the shield layer 103 disposed in a stack under the bridge layer 102. In some examples, the shield layer may also be omitted.

By moving wires of the stipe electrodes to the bridge layer 102 or an individual trace layer, area of the electrode patterns may be increased and difficulty in fabrication of wires may be reduced.

Alternately, instead that the electrode pattern layer is of a single-layer structure abovementioned and the electrode patterns of the strip electrodes need to be bridged by the bridge layer, the electrode pattern layer may be of a double-layer structure and thus there is no need to adopt bridging, facilitating simplification of production process.

With reference to FIGS. 8-11, the electrode pattern layer 101 is of a double-layer structure, and the plurality of first strip electrodes 104 are located in one layer of the double-layer structure, and the plurality of second strip electrodes 105 are located in the other layer of the double-layer structure. Specifically, the electrode pattern layer 101 includes a first sub-layer 1011 and a second sub-layer 1012 which are disposed in a stack, and the first sub-layer 1011 is located over the second sub-layer 1012. The plurality of first strip electrodes 104 are disposed in the second sub-layer 1012 (i.e., the lower layer of the electrode pattern layer 101), and the plurality of second strip electrodes 105 are disposed in the first sub-layer 1011 (i.e., the upper layer of the electrode pattern layer 101). For example, all of the first strip electrodes 104 and all of the second strip electrodes 105 are of rectangular electrode patterns, and the area of any upper-layer electrode pattern in the two-layer structure is smaller than the area of any lower-layer electrode pattern. Specifically, a first strip electrode 104 is, for example, a rectangular strip electrode having a length more than five times of its width, and a second strip electrode 105 is, for example, a rectangular strip electrode having a length more than eight times of its width. In this way, electrode patterns of the first sub-layer 1011 which is the upper layer of the electrode pattern layer 101 are narrower, so electrode patterns on the second sub-layer 1012 which is the lower layer may be exposed, so that sensing sensitivity of the electrode patterns on the second sub-layer 1012 is higher, to which the present disclosure is not limited, but in some examples, forms and sizes of the first strip electrodes 104 and second strip electrodes 105 may be adjusted.

It shall be noted that, the strip electrodes (i.e., the first strip electrodes 104 and the second strip electrodes 105) are connected to the touch controller 2 by wires 107 on the electrode pattern layer, to which the present disclosure is not limited.

It shall be noted that, the capacitive hover touch sensor further includes a shield layer 103 disposed in a stack under the electrode pattern layer 101. In some examples, the shield layer may be omitted.

This solution provides a double-layer electrode pattern layer, thereby eliminating the need for a bridging process, which is advantageous for simplifying the fabrication process.

Figure 12:
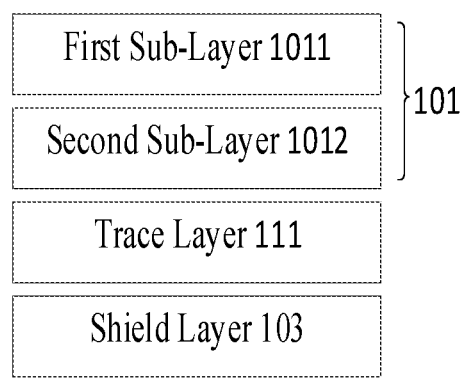
FIG. 12 is yet another schematic side diagram of a capacitive hover touch sensor.
Figure 13:
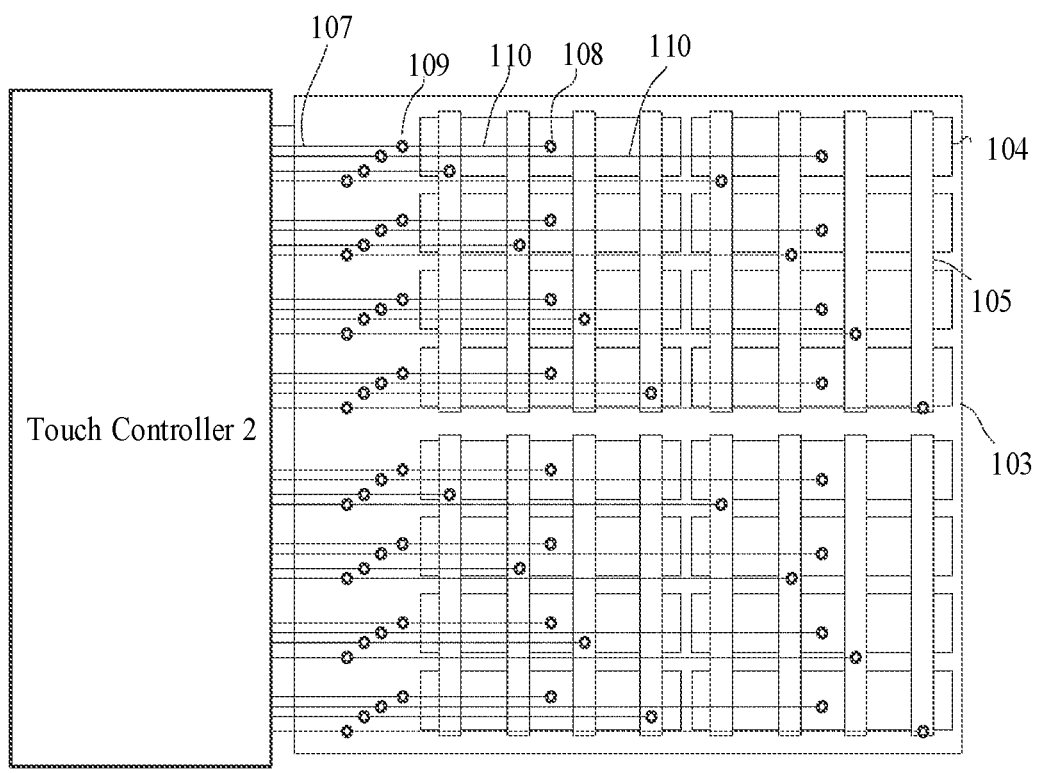
FIG. 13 is a yet another structural schematic diagram of a connection between strip electrodes of the capacitive hover touch sensor including a shield layer and a touch controller by a trace layer.
Figure 14:
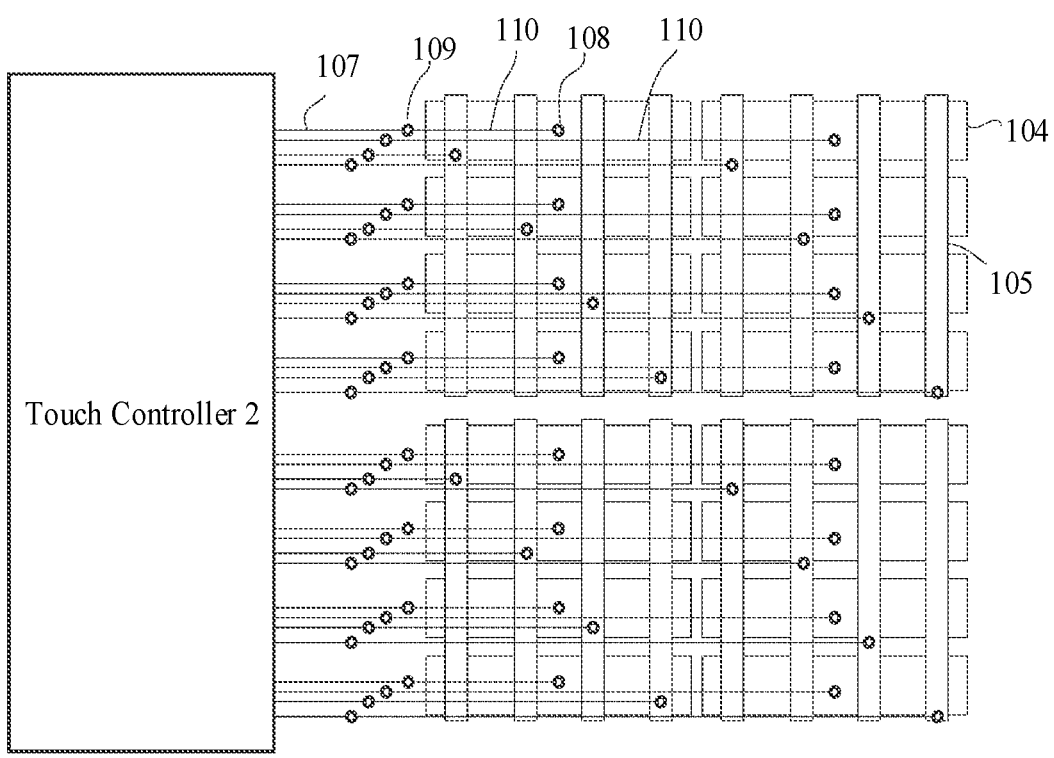
FIG. 14 is a yet another structural schematic diagram of a connection between the strip electrodes of the capacitive hover touch sensor not including the shield layer and the touch controller by a trace layer.

In another example, with reference to FIG. 12 to FIG. 14, the capacitive hover touch sensor includes an electrode pattern layer 101, a trace layer 111, and a shield layer 103 which are disposed in a stack one by one top down. The electrode pattern layer 101 is of a double-layer structure, and the plurality of first strip electrodes 104 are located in one layer of the double-layer structure, and the plurality of second strip electrodes 105 are located in the other layer of the double-layer structure. Specifically, the electrode pattern layer 101 includes a first sub-layer 1011 and a second sub-layer 1012 which are disposed in a stack, and the first sub-layer 1011 is located over the second sub-layer 1012. The plurality of first strip electrodes 104 are disposed in the second sub-layer 1012 (i.e., the lower layer of the electrode pattern layer 101), and the plurality of second strip electrodes 105 are disposed in the first sub-layer 1011 (i.e., the upper layer of the electrode pattern layer 101). For example, all of the first strip electrodes 104 and all of the second strip electrodes 105 are of rectangular electrode patterns, and the area of any upper-layer electrode pattern in the two-layer structure is smaller than the area of any lower-layer electrode pattern. Specifically, a first strip electrode 104 is, for example, a rectangular strip electrode having a length more than five times of its width, and a second strip electrode 105 is, for example, a rectangular strip electrode having a length more than eight times of its width. In this way, electrode patterns of the first sub-layer 1011 which is the upper layer of the electrode pattern layer 101 are narrower, so electrode patterns on the second sub-layer 1012 which is the lower layer may be exposed, so that sensing sensitivity of the electrode patterns on the second sub-layer 1012 is higher, to which the present disclosure is not limited, but in some examples, forms and sizes of the first strip electrodes 104 and second strip electrodes 105 may be adjusted. First vias 108 are formed in the electrode patterns of the first strip electrodes 104 and the second strip electrodes 105, and second vias 109 are formed in the electrode pattern layer 101; the first vias 108 and the second vias 109 are electrically connected by wires 110 in the trace layer 111, and the second vias 109 are connected to the touch controller 2 by wires 107 on the electrode pattern layer 101, so that the first strip electrodes 104 and the second strip electrodes 105 are electrically connected to the touch controller 2. Specifically, the plurality of second vias 109 may be in an array, and the plurality of first vias 108 may also be in an array. Herein, the first vias 108 of any first strip electrode 104 in each sub-region may be arranged in a row and on the rectangular electrode patterns, and the first vias 108 of any second strip electrode 105 may be disposed in a generally equidistant manner in the extending direction of the second strip electrodes 105, thereby facilitating fabrication of the first vias 108 and the second vias 109. By moving wires that connect the first strip electrodes 104 to the touch controller 2 and the second strip electrodes 105 to the touch controller 2 to the trace layer 111, the wires of the strip electrodes may be prevented from occupying too much area of the electrode pattern layer 101, which further facilitates increasing area taken by the electrode patterns and improving sensitivity of hover touch. The trace layer 111 is interconnected through the second vias 109 to the electrode pattern layer 101 to realize interconnection between the strip electrodes and the touch controller 2, to which the present disclosure is not limited, for example, electrodes in the electrode pattern layer 101 may be interconnected with the touch controller 2 through other layers of the capacitive hover touch sensor. In some examples, some of the first strip electrodes and second strip electrodes may be interconnected with the touch controller 2 through the trace layer, or either the first strip electrodes 104 or the second strip electrodes 105 may be interconnected with the touch controller 2 through the trace layer.

It shall be noted that, the shield layer 103 is disposed in a stack under the trace layer 111. In some examples, the shield layer may be omitted.

By moving wires of the stipe electrodes to the trace layer, area of the electrode patterns may be increased, difficulty in fabrication of wires may be reduced, and sensitivity of hover touch may be improved.

Figure 11:
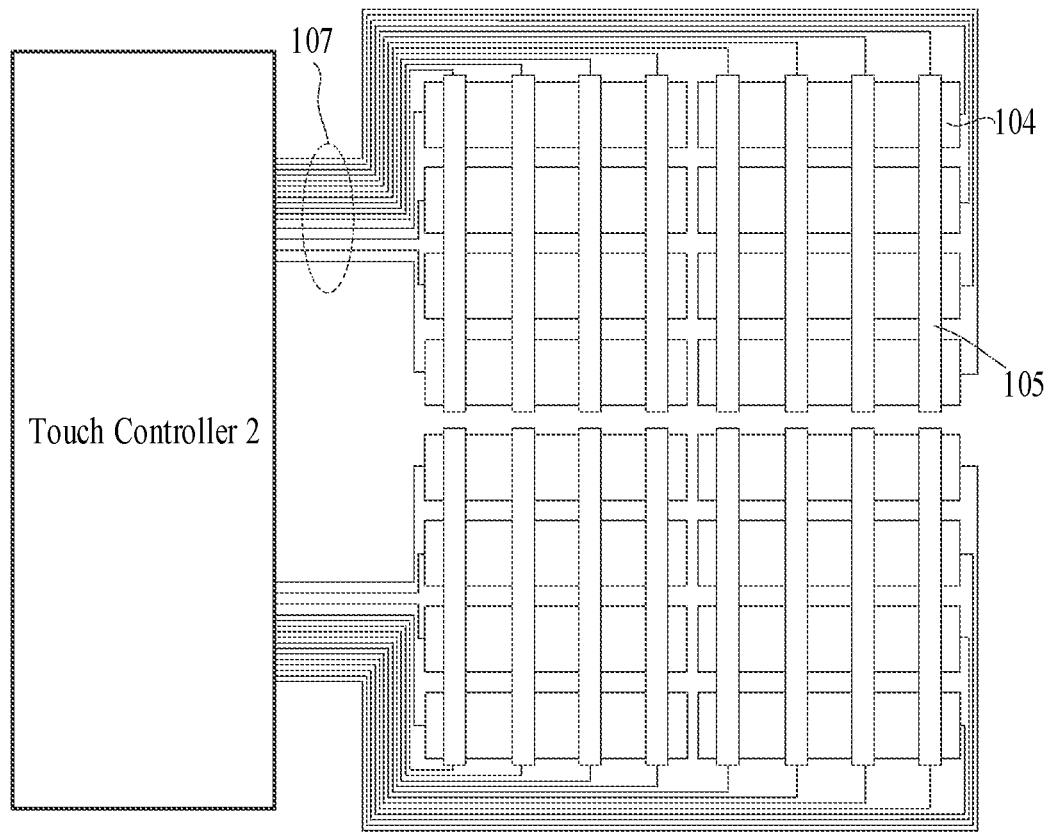
FIG. 11 is still another structural schematic diagram of a connection between the strip electrodes of the capacitive hover touch sensor not including the shield layer and the touch controller.

The present disclosure further relates to a capacitive hover touch device that may be applied to an electronic equipment such as a smart phone, a tablet computer, a laptop, or the like. With further reference to FIGS. 5, 11, and 13, the capacitive hover touch device includes the touch controller 2 and the capacitive hover touch sensor as described above, and the capacitive hover touch sensor is connected to the touch controller.

Compared with the existing technology, by using a crossover arrangement of strip electrodes to realize multi hover, this solution solves the problems of difficulty in design and fabrication and high cost due to too large numbers of capacitance detection channels, wires and pins of touch controller resulted from multi hover by directly using individual capacitive detection channels.

The present disclosure further relates to an electronic equipment, for example, an electronic equipment such as a smartphone, a tablet computer, a laptop, or the like. The electronic equipment includes the capacitive hover touch device as described above. The capacitive hover touch device may be integrated into the display of the electronic equipment. The display screen of the electronic equipment may be a hard screen or a flexible screen.

Compared with the existing technology, by using a crossover arrangement of strip electrodes to realize multi hover, this solution solves the problems of difficulty in design and fabrication and high cost due to too large numbers of detection channels, wires and pins of touch controller resulted from multi hover by directly using individual capacitive detection channels.

Those skilled in the art shall appreciate that the aforementioned examples are specific examples for implementing the present invention. In practice, however, many changes can be made in the forms and details of the specific embodiments without departing from the spirit and scope of the invention.

What is claimed is:

1. A capacitive hover touch sensor, comprising:
   an electrode pattern layer that forms a touch region; wherein
   the touch region is divided into P sub-regions, P being a natural number greater than 1;
   each of the sub-regions is provided with a plurality of first strip electrodes in a one-dimensional array and a plurality of second strip electrodes in a one-dimensional array;
   the plurality of first strip electrodes are interdigitated with the plurality of second strip electrodes;
   the plurality of first strip electrodes in each of the sub-regions and the plurality of second strip electrodes in each of the sub-regions are respectively connected to a touch controller by wires; and
   the capacitive hover touch sensor further comprises a trace layer disposed in a stack with the electrode pattern layer;
   first vias are formed in the first strip electrodes and the second strip electrodes, and second vias are formed in the electrode pattern layer; the first vias and the second vias are respectively connected by wires in the trace layer, and the second vias are connected to the touch controller by wires on the electrode pattern layer.

2. The capacitive hover touch sensor according to claim 1, wherein the electrode pattern layer is of a single-layer structure, and the capacitive hover touch sensor further comprises a bridge layer disposed in a stack with the electrode pattern layer;
   wherein the plurality of first strip electrodes and the plurality of second strip electrodes are located in the electrode pattern layer of the single-layer structure;
   wherein each of the plurality of first strip electrodes and each of the plurality of second strip electrodes respectively comprise a plurality of electrode patterns, the plurality of electrode patterns of the first strip electrodes are connected in series, and the plurality of electrode patterns of the second strip electrodes are connected in series; and
   wherein the electrode patterns of the plurality of first strip electrodes are interdigitated with the electrode patterns of the plurality of second strip electrodes, and wherein the electrode patterns of either the first strip electrodes or the second strip electrodes at intersection points are bridged connected by the bridge layer;

the bridge layer is reused as the trace layer, and the wires in the trace layer bypass a bridge region.

3. The capacitive hover touch sensor according to claim 2, wherein the plurality of electrode patterns of each of the plurality of first strip electrodes are triangular electrode patterns located at both ends of the first strip electrodes and a plurality of rhombic electrode patterns located between the triangular electrode patterns, and wherein two triangular electrode patterns of any first strip electrode respectively have one vertex toward the center of the first strip electrode; and wherein the plurality of electrode patterns of each of the plurality of second strip electrodes are triangular electrode patterns located at both ends of the second strip electrodes and a plurality of rhombic electrode patterns located between the triangular electrode patterns, and wherein two triangular electrode patterns of any second strip electrode respectively have one vertex toward the center of the second strip electrode.

4. The capacitive hover touch sensor according to claim 2, further comprising a shield layer for providing shielding protection for the electrode pattern layer.

5. The capacitive hover touch sensor according to claim 2, wherein each of the sub-regions comprises four first strip electrodes and four second strip electrodes.

6. The capacitive hover touch sensor according to claim 1, wherein the electrode pattern layer is of a double-layer structure; and wherein the plurality of first strip electrodes are located in one layer of the double-layer structure, and the plurality of second strip electrodes are located in the other layer of the double-layer structure.

7. The capacitive hover touch sensor according to claim 6, wherein the plurality of first strip electrodes and the plurality of second strip electrodes are of rectangular electrode patterns, and an area of electrode patterns of an upper layer in the double-layer structure is smaller than an area of electrode patterns of a lower layer.

8. The capacitive hover touch sensor according to claim 6, further comprising a shield layer for providing shielding protection for the electrode pattern layer.

9. The capacitive hover touch sensor according to claim 6, wherein each of the sub-regions comprises four first strip electrodes and four second strip electrodes.

10. The capacitive hover touch sensor according to claim 1, further comprising a shield layer for providing shielding protection for the electrode pattern layer.

11. The capacitive hover touch sensor according to claim 1, wherein each of the sub-regions comprises four first strip electrodes and four second strip electrodes.

12. A capacitive hover touch device, comprising a touch controller and a capacitive hover touch sensor, wherein the capacitive hover touch sensor is connected to the touch controller;

wherein the capacitive hover touch sensor comprises: an electrode pattern layer that formed a touch region; wherein:

the touch region is divided into P sub-regions, P being a natural number greater than 1;

each of the sub-regions is provided with a plurality of first strip electrodes in a one-dimensional array and a plurality of second strip electrodes in a one-dimensional array;

the plurality of first strip electrodes are interdigitated with the plurality of second strip electrodes;

the plurality of first strip electrodes in each of the sub-regions and the plurality of second strip electrodes in each of the sub-regions are respectively connected to a touch controller by wires; and the capacitive hover touch sensor further comprises a trace layer disposed in a stack with the electrode pattern layer;

first vias are formed in the first strip electrodes and the second strip electrodes, and second vias are formed in the electrode pattern layer; the first vias and the second vias are electrically connected by wires in the trace layer, and the second vias are connected to the touch controller by wires on the electrode pattern layer.

13. An electronic equipment, comprising a capacitive hover touch device wherein the capacitive hover touch device comprised a touch controller and a capacitive hover touch sensor, wherein the capacitive hover touch sensor is connected to the touch controller;

wherein the capacitive hover touch sensor comprised: an electrode pattern layer that formed a touch region; wherein the touch region is divided into P sub-regions, P being a natural number greater than 1;

each of the sub-regions is provided with a plurality of first strip electrodes in a one-dimensional array and a plurality of second strip electrodes in a one-dimensional array;

the plurality of first strip electrodes are interdigitated with the plurality of second strip electrodes;

the plurality of first strip electrodes in each of the sub-regions and the plurality of second strip electrodes in each of the sub-regions are respectively connected to a touch controller by wires; and the capacitive hover touch sensor further comprises a trace layer disposed in a stack with the electrode pattern layer;

first vias are formed in the first strip electrodes and the second strip electrodes, and second vias are formed in the electrode pattern layer; the first vias and the second vias are electrically connected by wires in the trace layer, and the second vias are connected to the touch controller by wires on the electrode pattern layer.

* * * * *